J. H. WARREN.
APPARATUS FOR SEPARATING MATERIALS.
APPLICATION FILED APR. 6, 1917.
1,274,114.
Patented July 30, 1918.
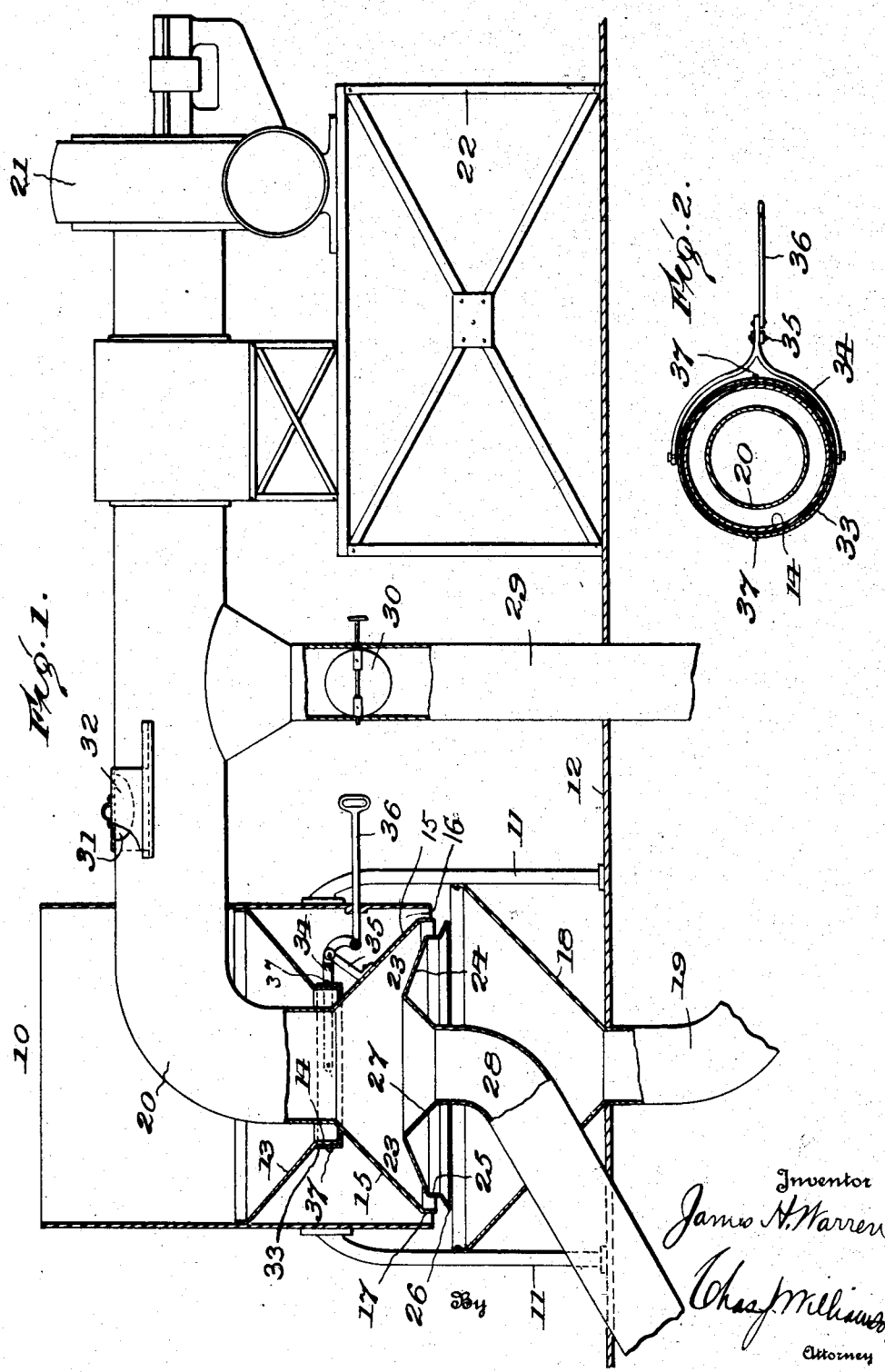

UNITED STATES PATENT OFFICE.

JAMES H. WARREN, OF BALTIMORE, MARYLAND.

APPARATUS FOR SEPARATING MATERIALS.

1,274,114.

Specification of Letters Patent.   Patented July 30, 1918.

Application filed April 6, 1917.   Serial No. 160,219.

*To all whom it may concern:*

Be it known that I, JAMES H. WARREN, a citizen of the United States, and resident of Baltimore, in the county of Baltimore City, and in the State of Maryland, have invented a certain new and useful Improvement in Apparatus for Separating Materials, and do hereby declare that the following is a full, clear, and exact description thereof.

My invention has to do with the separation of mixtures of materials of different specific gravity, such as grain and refuse, or other material, that call for separation, and my object is to provide an apparatus for the purpose which will combine the desirable characteristics of thoroughly effecting the separation; simplicity; and inexpensiveness, both in regard to first cost of construction of the apparatus, and the cost of operation and maintenance thereof; and with this object in view my invention consists in the apparatus substantially as hereinafter described and claimed.

In the accompanying drawings—

Figure 1 is a view partly in side elevation and partly in section of an apparatus illustrating an embodiment of my invention;

Fig. 2 is a horizontal section through the material-regulating device.

My invention is specially adapted to and is of importance for the separation, or cleaning of grain, as for example, wheat mixed with other grain, cockle, weevil, dust, garlic, smut, and other foreign matter, etc., and it will, therefore, be convenient in describing the construction and operation of the apparatus to consider it as operating for the separation of grain, but it is to be understood that I do not thereby limit the use of my invention to any particular materials, or mixture of materials, but regard myself as entitled to its use upon any materials required to be separated, or cleaned, and to the separation, or cleansing of which it is applicable. Briefly described my invention contemplates the delivery to, and flow through, a chamber, of materials to be separated, in which chamber the flowing materials are subjected to the action of a flowing current of air whose pressure is such that it cannot overcome the gravity of the heaviest material, say for illustration, wheat, while sufficient to carry lighter materials away from the wheat, and subsequently to effect the separation of these lighter materials. The chamber 10 to which the grain is delivered may, as shown in the drawings, be a cylindrical shell supported in a vertical position by legs 11 resting upon a floor 12, and into which the grain is delivered at the top. Within the chamber 10 is a downwardly and inwardly inclined partition 13 having a short downwardly extending neck 14 at its lowest and most contracted point forming, as will be evident, what in effect is a funnel, so that grain flowing down through the chamber 10 will be guided by said funnel inwardly and be discharged in a contracted stream through the neck, or nozzle 14. The widest portion of the funnel, of course, extends to the inner sides of the chamber 10. Below and concentric with said funnel is a downwardly and outwardly inclined, or flaring baffle plate 15 in the form of a conical shell whose smallest diameter is less than the diameter of the nozzle 14 within which it extends, while its largest diameter is less than the internal diameter of the chamber 10 so that an annular space 16 is left between the lower and largest end of the baffle 15, and the interior of the chamber 10. Preferably the lower end of the baffle 15 terminates in a cylindrical downwardly projecting flange 17. It will thus be seen that grain discharged through the nozzle 14 will pass in a thin stream downward and outward over the outer side of the conical baffle 15 and thence downward and outward from the chamber 10 through the annular space 16. Immediately below the lower end of the chamber 10 is a receiving funnel, or hopper 18, whose large upper end is of greater diameter than said chamber to make sure that the hopper will catch all the material coming from the chamber, and the lower small end of said hopper connects with a discharge pipe 19 which leads to some convenient point for the delivery of material that enters the hopper 18. If wheat is being treated the material to be delivered to the hopper 18 is the wheat, freed, and cleansed as hereinafter explained, from other grain, or refuse accompanying it when delivered into chamber 10.

The upper small end of the baffle 15 is connected with a flue, or pipe 20 which in the form of an elbow extends upward through the chamber 10 and then laterally, or horizontally and at a convenient point is connected with a fan 21, shown as a rotary fan, and supported on a suitable base, or frame work 22 resting on the floor 12.

By the fan a current, or flow of air passes into the baffle 15 from a point outside the chamber 10 flowing between the top of the hopper 18 and the bottom of the chamber 10, and crossing the stream of grain passing downward through the annular space 16 at the bottom of the chamber 10, the air pressure being such as not to overcome the gravity of the falling wheat, but being sufficient to carry from the flowing stream of grain lighter material and thus allow the wheat alone to pass down into and out of the hopper 18.

I produce a diminishing pressure of the air within the baffle 15 so that while a sufficient pressure exists at the point where the inflowing air strikes the stream issuing from the annular space 16 to cause the carrying into the conical baffle 15 of all the material, except the wheat,—that is the heaviest—such pressure may be sufficiently reduced within the cone 15 as to permit the release within the cone of certain materials lighter than the wheat, say for example, oats, and thus their separation effected at such point by gravity, while the materials light enough still to be borne, or carried onward by the air pressure will pass upward into and through the flue 20. I accomplish this second separation by forming within the conical baffle 15 at the lower part thereof, a passage 23, which beginning at the flange 17 flares, or enlarges inwardly, and which is formed between the inner surface of the baffle 15 and its flange 17 and a frusto-conical partition 24 that inclines upward and inward and has at its largest end a vertical flange 25 from which extends an outwardly turned, or flaring lip 26. At its upper and smallest end the frusto-conical partition 24 is attached to the downwardly and inwardly flaring upper end 27 of a downwardly inclined discharge pipe 28 into which falls the material that is freed, or released by the reduction of air pressure which takes place within the conical baffle 15 beyond the passage 23. The discharge end of the pipe 23 is carried to some convenient point where it is desired to deliver the material falling into the same.

Some of the material entering the pipe 20 may be so light that it will be carried a considerable distance through the pipe and even to the fan and discharged from the exhaust of the fan and other may be sufficiently heavy as to permit of its removal by gravity at some intermediate point and I, therefore, provide a downwardly extending branch, or outlet pipe 29 from the pipe, or flue 20 for the removal of such heavy material, and, of course, similar branch pipes may be provided at different points along the length of the pipe 20 to effect the discharge of all, or substantially all of the material before any of it can reach the fan. Preferably in the branch pipe 29 a damper 30 is provided to control the flow therethrough.

To enable the regulation of the pressure flowing through the stream of grain at the nozzle of the air pipe, I provide an air inlet 31 in the pipe 20 which may be wholly closed, or opened to any desired degree by a slide valve 32. Said air inlet 31 is preferably located in the pipe 20 above and somewhat forward from the inlet of the branch pipe 29 so that when the slide 32 partially uncovers the air inlet 31 and air flows therethrough into the pipe 20, it will have the effect of causing a downward, or precipitating movement of the particles flowing through the pipe 20 and causing their entry into the discharge pipe 29.

Means are preferably provided to regulate the quantity of grain discharged from the funnel 13. A simple and efficient valve for this purpose is shown in the drawings which consists of a ring, or band 33 slidably fitting the outside of the funnel neck 14 so that it may be moved toward and from the outer surface of the baffle 15. For so moving it a lever 34 is pivotally connected with the band, said lever being pivoted to a bracket arm 35 conveniently mounted on the baffle plate 15 and being connected with an operating rod 36 which extends to the exterior of the chamber 10. To ease the sliding movement of the band 33, antifriction rollers 37 may be applied to it.

Apparatus embodying my invention may be installed at any desired point and the construction and the capacity of the installation will, of course, vary with the place and conditions of use which may be at the farm, or the elevator. It is, therefore, to be understood that I do not limit myself to apparatus having just the form and proportions of what is shown in the drawing, nor to embodiments of my invention having the particular characteristics of the organization shown in the drawings.

If desired for the purpose of preventing the entrance into the chamber 10 of broken sticks, or other debris of more or less bulk, a sieve, or screen may be employed for preventing such debris entering the chamber 10.

Having thus described my invention what I claim is:—

1. Apparatus of the class described having a chamber through which the material to be treated flows, means for diminishing the pressure of the air after passing through the flowing material, means for subjecting the flowing material to the action of a current of air, and several independent outlets for the separated materials, one of which receives material released by the drop in air pressure.

2. Apparatus of the class described having a chamber through which the material to be treated flows, said chamber having an air inlet, means for diminishing the pressure of the air after passing through the flowing material comprising plates leading inward from said air inlet and diverging from each other inwardly, means for subjecting the flowing material to the action of a current of air, and several independent outlets for the separated materials, one of which is in communication with the space between said plates at the point of greatest divergence thereof.

3. Apparatus of the class described having a chamber through which the material to be treated flows, a hopper below said chamber having an outlet, an air passage being provided between said chamber and hopper adjacent the path of flowing material, means for causing the flow of air through said passage, a downwardly extended material-receiving pipe within said hopper to which a passage extends inwardly from said air passage, and an air pipe leading away from said material-receiving pipe.

4. Apparatus of the class described having a chamber through which the material to be treated flows, an air nozzle situated adjacent the path of flowing material, means for causing the passage of air through said nozzle, a downwardly extending material-receiving pipe leading from such nozzle and adapted to receive material passing with the air through the nozzle, an air pipe leading away from said material-receiving pipe into which the air passing through the nozzle enters, a valve controlled opening in said air pipe, and a branch outlet from the side of said air pipe opposite said valve controlled opening.

5. Apparatus of the class described having a chamber through which the material to be treated flows, having a contracted outlet for the material, an air nozzle within the chamber adjacent said outlet, an outlet for the discharge of material in communication with the inner end of said nozzle, an air pipe leading from the inner end of said nozzle away from said outlet and being distinct from said outlet, so that air flows therethrough separate from the material flowing through said outlet, and means for causing the flow of air through said nozzle and through said air pipe.

6. Apparatus of the class described having a chamber through which the material to be treated flows, a funnel within such chamber, a downwardly and outwardly inclined baffle leading from the discharge end of the funnel, a space being left between such baffle and the interior of the chamber for the passage from the chamber of material therein, there being a surface leading from such space inward and diverging from the adjacent sides of the baffle to form an inwardly flaring passage, a gravity outlet leading from such surface, an air pipe opposite such outlet and in communication with said flaring passage at its larger end, and means for causing a flow of air through said pipe.

7. Apparatus of the class described having a chamber through which the material to be treated flows, a funnel within such chamber, a downwardly and outwardly inclined baffle leading from the discharge end of the funnel, a space being left between such baffle and the interior of the chamber for the passage from the chamber of material therein, there being a surface leading from such space inward and diverging from the adjacent sides of the baffle to form an inwardly flaring passage, a gravity outlet leading from such surface, an air pipe opposite such outlet and in communication with said flaring passage at its larger end, and a material outlet below the discharge end of said chamber.

In testimony that I claim the foregoing I have hereunto set my hand.

JAS. H. WARREN.

Copies of this patent may be obtained for five cents each, by addressing the "Commissioner of Patents, Washington, D. C."